United States Patent Office 3,354,104
Patented Nov. 21, 1967

3,354,104
PIGMENT DISPERSANTS COMPRISING PHOS-
PHONIC ACID DIELS-ALDER ADDUCTS OF
VEGETABLE OIL MATERIALS
Raymond Noel Faulkner, Hanworth, and Nirmal Sen,
Welwyn Garden City, England, assignors to the United
States of America as represented by the Secretary of
Agriculture
No Drawing. Filed Mar. 16, 1965, Ser. No. 440,334
4 Claims. (Cl. 260—22)

A nonexclusive, irrevocable, royalty-free license in the invention herein described, throughout the world for all purposes of the United States Government, with the power to grant sublicenses for such purposes, is hereby granted to the Government of the United States of America.

This invention relates to novel phosphonated derivatives (Diels-Alder adducts) of vegetable oil materials having conjugated unsaturation, to a process for preparing the same, and to the employment of these derivatives in an unobvious method for completely inhibiting the flotation of phthalocyanine blue-tinted titanium dioxide alkyd paints.

In copending application, S.N. 367,261 filed May 13, 1964, of Faulkner and Berry, it is taught that the stability of dispersions or suspensions of titanium dioxide pigment in a napha vehicle is greatly improved when the pigment has been pretreated with a dilute water-miscible organic solvent solution of phosphinic acid-substituted methyl oleate in a water-miscible organic solvent such as acetone or a glycol ether, the phosphinated methyl oleate being a known acyclic compound formed by reaction with $PCl_3$. However, phosphinated methyl oleate and the prior art lauryl and stearyl phosphonic acids have limited solubilities in the usual paint solvents and give little if any protection against the flotation (color unevenness) of phthalocyanine blue pigment in a highly reflective paint. A principal object of the present invention is the synthesis of novel and unobviously superior phosphonic acid derivatives of vegetable oil materials. Another object is the preparation of P-acid, i.e., $-P(O)(OH)_2$ containing Diels-Alder adducts of vegetable oil materials having conjugated unsaturation. These adducts when not highly substituted, i.e., when the mole ratio of vinyl phosphonic acid or dichloride to the fatty reactant is 1:1, are completely soluble in both aliphatic-type paint solvents such as petroleum ether and aliphatic naptha and in aromatic solvents such as xylene. More highly substituted adducts of up to 1.7 mole of phosphonic reactant per mole of fatty reactant differ by the absence of complete solubility in aliphatic solvents. Another object is a novel general method of introducing P-acid substituents consisting of highly stable $$-P(O)(OH)_2$$

phosphonic groups into polyunsaturated vegetable oils and vegetable oil acids or esters. Yet another object is a method for greatly improving the dispersion stability of paint pigments and particularly for inhibiting the flotation tendencies of phthalocyanine pigments in titanium dioxide paints. Other objects and advantages of the invention will become apparent to those skilled in the art.

In accordance with the objects of this invention, we have prepared phosphonic acid Diels-Alder adducts of isomerized vegetable oils such as safflower oil, dehydrated castor oil, etc., and the corresponding derivatives of conjugated fatty esters such as methyl 9,11-linoleate by a novel process which involves reacting the oil or ester with vinyl phosphonic acid in the presence of a catalytic amount of azo-bis-isobutyronitrile. If the vinyl phosphonic acid is not highly compatible with the fatty material, the reaction is greatly improved by substituting the more compatible vinyl phosphonic dichloride but the resulting dichloride ester must then be hydrolyzed.

Example 1

Vacuum distilled vinyl phosphonic dichloride $$n_D^{20} = 1.4820$$

(2.8 g.; 0.02 mole) obtained by dehydrochlorinating β-chloroethyl phosphonic dichloride as taught by Rochlitz, et al., Angew. Chem. (Int'l Ed.) 1, 12:652 (1962); methyl linoleate (8.0 g.; 0.0267 mole) having a 9,11-diene content of 80 percent, and azo-bis-isobutyronitrile (0.016 g.; 0.15% based on the weight of the reactants) were mixed, the mixture degassed by alternate freezing and thawing, the degassed mixture sealed under vacuum, and the sealed tube then heated at 150° C. for 25 hours. Fractionation of the product by pot distillation at $10^{-3}$ mm. gave fraction 1 (40° C.) consisting of only a trace of vinyl phosphonic acid dichloride; fraction 2 (100° C.) consisted of unreacted methyl linoleate and represented 55 percent of the product; adduct fraction 3 (150° C.), $n_D^{20} = 1.4935$ constituted 30 percent of the product; residue fraction 4 represented about 15 percent of the product. The adduct fraction (3) analyzed 16.25 percent Cl and had acid and saponification values of 354 and 504, respectively, whereas calculation shows that a 1:1 adduct of methyl linoleate and vinyl phosphonic dichloride requires Cl=16.1 percent, acid value of 510, and a saponification value of 637. The anomalous analytical results obtained with the above P-chloride adduct may possibly be due to the loss of chlorine groups resulting from the formation of esters (phosphonates) via reaction with ethyl alcohol used as the solvent in the determination of acid and saponification values. It was subsequently found that the adduct could be successfully characterized by analysis of the P-acid adduct obtained by hydrolysis of fraction (3) as indicated below. Accordingly, the adduct was dissolved in methylene chloride, and slightly more than 2 molar equivalents of water based on the calculated vinyl phosphonic acid content of a 1:1 adduct were added. The mixture was refluxed gently for ½ hour, left overnight, the solvent removed by distillation, and the desired linoleate-phosphonic acid adduct then freed of final traces of water under high vacuum. The 1:1 adduct, which was soluble in ethanol and in petroleum ether gave the following analyses: acid value 241 mg. KOH/gm.; calc'd 280 mg.: saponification value 417 mg. KOH/gm.; calc'd 420 mg.: C, 63.7%; calc'd 62.6%; H, 9.7%, calc'd 9.2%, P, 7.1%, cal'd 7.9%. It should be pointed out that the direct formation of the adduct using vinyl phosphonic acid was found to be practicable because the acid was incompatible with methyl linoleate. However, as suggested above, formation of the desired adduct was more readily obtained by substituting vinyl phosphonic dichloride and then hydrolyzing the resulting fatty/P-acid dichloride as in the following schematic equations:

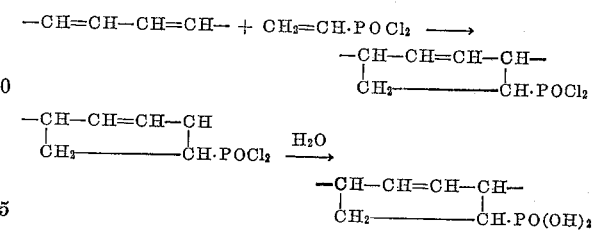

It will also be readily appreciated that with vinyl phosphonic dichloride it is necessary to use anhydrous reactants to prevent hydrolysis of the dichloride to vinyl phosphonic acid acid prior to the desired reaction.

The ability of our vegetable oil phosphonic acid adducts to prevent flotation in various phthalocyanine blue-tinted TiO$_2$ long oil alkyd paints, i.e., a linseed/phthalic/pentaerythritol alkyd, a linseed/phthalic/glycerol alkyd (acid value 10), and a linseed/phthalic/glycerol alkyd (acid value 18.5) was tested as follows. Treated paints were prepared from 40 g. TiO$_2$, 1.6 g. phthalocyanine blue, 48.8 g. of a said long oil alkyd, and 0.4–1.6 g. of a phosphonic acid adduct dissolved in 45 ml. of either xylol or petroleum naphtha. After ball milling overnight to a Hegman gauge reading of 10, the paint was filtered, and 0.05-percent cobalt and 0.1 percent lead as naphthenates were added. The untreated control was similarly prepared from 40 g. TiO$_2$, 1.6 g. phthalocyanine blue, and 50 g. of the same alkyd in 45 ml. xylol or naphtha. The treated and control paints were brushed onto 4″ x 3″ glass panels, left horizontally to "dry" for 3 minutes, the panels then placed at an angle of 45°, and then 1 ml. of the same paint initially applied was poured onto a portion of the upper edge of each panel, descending to provide a band about 1″ wide. After the paints set, it was seen that the film from the treated paint had a uniform color and that the tint was considerably stronger than from the control, especially in the case of paints made up in xylol, thus indicating improved dispersion. Thus flotation was prevented using either petroleum naphtha of xylol as the solvent in the above paint systems. A study of the relationship between the contrast ratio and film thickness has shown that the opacity of films from the treated paints is greater than those from control paints, which is further evidence for enhanced dispersion. The controls showed flotation of blue and white pigment in both the "brushed" and "poured" areas and at the thick interface and strongly showed Bénard cell tendencies. No defects were observed with the treated paints. Panels coated with controls containing 2 percent or 4 percent of lecithin by weight of the alkyd solids showed only a very limited improvement in tint intensity, i.e., pigment dispersion over the untreated control but no significant prevention of flotation. Furthermore, after 5 days of storage the alkyds treated with our phosphonic acid adducts showed negligible settling of pigment while the controls showed very heavy settling. The drying time of paint films containing phosphonic acid adduct was little affected compared with a control. With respect to gloss, however, treated paints in petroleum naphtha gave films having slightly reduced gloss compared with controls, particularly when the phosphonic acid adduct was insoluble in petroleum naphtha, whereas treated paints in xylol gave films with high gloss. Data on the settling (dispersion effects) on other pigments are presented in Table I, details of the test being as follows:

To 1 g. of a pigment (5 g. in the case of TiO$_2$) in a 50 ml. measuring cylinder was added 0.1 g. of dehydrated castor or isomerized safflower oil P-acid (1:1 molar reaction products of the oil and vinyl phosphonic dichloride) and 2 ml. of xylol. After mixing thoroughly with a glass rod, more xylol was added to make up the volume to 50 ml. The cylinder was shaken vigorously for 2 minutes and allowed to settle. Comparison tests were carried out using dehydrated castor or isomerized safflower oil.

TABLE I.—EFFECT OF P-ACIDS ON SETTLING AND STATE OF DISPERSIONS OF VARIOUS PIGMENTS

| Pigment | Additive | Observation |
| --- | --- | --- |
| TiO$_2$ (rutile) | Dehydrated castor oil (D.C.O.). | Pigment settled in about ½ hr. |
|  | Isomerized safflower oil (I.S.O.). | Do. |
|  | D.C.O./Vinyl P-acid, or I.S.O./Vinyl P-acid. | Very little settling in 8 hrs.; about 2 ml. overnight. |
| Phthalocyanine blue (α form, containing 2 Cl-atoms). | D.C.O. | Settled in about ½ hr. |
|  | D.C.O./Vinyl P-acid | Very little settling in 8 hrs.; slight settling overnight. Supernatant liquid highly coloured. |
| Carbon black | D.C.O., D.C.O./Vinyl P-acid. | Settled at the same rate. |
| Hello red | D.C.O., D.C.O./Vinyl P-acid. | Settling was faster with P-acid. |
| Prussian blue | D.C.O. | 25 ml. settled in 5 hrs.; supernatant layer slightly coloured. |
|  | D.C.O./Vinyl P-acid | About 2.5 ml. settled in 5 hrs.; intense blue coloured supernatant layer. |
| Phthalocyanine green | D.C.O. | Settled in about 2 hrs.; green supernatant layer. |
|  | D.C.O./Vinyl P-acid | Settled in about 96 hrs.; green supernatant layer. |
| Iron oxide | D.C.O. | Settled in about 2 hrs. |
|  | D.C.O./Vinyl P-acid | Did not settle overnight. |

Example 2

A mixture consisting of isomerized safflower oil 18.0 g. having a conjugated diene content of 54 percent and a trans isomer content of about 50 percent, vinyl phosphonic dichloride 6.0 g. (mole ratio of 1:2), and azo-bis-isobutyronitrile 0.04 g. was degassed, sealed under vacuum, and heated at 150° C. for 25 hours. Unreacted vinyl phosphonic dichloride was then removed by vacuum distillation. Removal of the very small amount of unreacted safflower oil by pot distillation was impracticable. An aqueous methylene chloride solution of the crude product comprising the dichloride ester of the adduct was hydrolyzed as described in Example 1. Inasmuch as the thusly de-esterified phosphonic acid safflower oil adduct was found to be incompletely soluble in aliphatic solvent naphtha and in petroleum ether though completely soluble in xylol, a portion thereof was fractionated by refluxing with petroleum ether which provided about 65 percent of a soluble material having an acid value of 110 mg. KOH/gm. and about 35 percent of an insoluble residue. Upon refluxing the residue with water there were obtained about 2 percent, based on the amount of adduct subjected to reflux with water, of a water soluble material consisting mainly of polyvinyl phosphonic acid and about 30 percent on the same bases of a water and also petroleum ether insoluble material having an acid value of 180 mg. KOH/gm. corresponding approximately to a 1:1.7 adduct. Additions to a phthalocyanine blue tinted TiO$_2$ paint of xylol or petroleum naphtha solutions containing 2 percent, based on the pigment, of either the petroleum ether soluble or petroleum ether insoluble fraction suppressed pigment flotation.

Example 3

In view of the incomplete solubility of the hydrolyzed adduct of Example 2 in solvent naptha and in petroleum ether, a lesser extent of phosphonic substitution was desired. Accordingly, a 1:1 mole ratio of reactants, i.e., 18 g. of the same safflower oil used in the previous example, 2.8 g. of vinyl phosphonic dichloride, and 0.04 g. of azo-bis-isobutyronitrile was reacted as in Example 2, a methylene chloride solution of the crude product subjected to aqueous hydrolysis, and the adduct having an average of about only 1 P-acid substituent per triglyceride (about half as much phosphonic acid substitution as the petroleum ether insoluble adduct of Example 2) was then freed of solvent and residual moisture as in Example 2. The adduct was completely soluble in aliphatic solvents, e.g., petroleum ether and naphtha as well as in aromatic solvents, e.g., xylol. The adduct was characterized by an acid value of 90, $n_D^{20}$ of 1.4869, and P content of 2.5 percent.

The above adduct was found to completely prevent pigment flotation in phthalocyanine blue-tinted $TiO_2$ alkyd paints when added at a level of about 4 percent by weight based on the alkyd. Addition at a level of 2 percent almost completely suppressed pigment flotation, and there was a very great improvement as compared with the alkyd containing no additive or only 1 percent thereof. Comparative tests also showed that the less highly substituted safflower oil phosphonic adduct produces much better pigment dispersion, particularly with respect to the readily observable suppression of pigment flotation, than lecithin at the same level of addition. The P-acid groups in lecithin are linked to the fatty chains by relatively unstable >P—O—C bonds in contrast to the P-C linkage as in our fatty adducts, but lecithin contains combined quaternary amine groups which contribute to lecithin's well known emulsifying properties and which may well also provide a dispersant effect. Thus, the marked superiority of our novel nonquaternary phosphonic adducts in suppressing pigment flotation is indeed unexpected and unobvious. We do not intend to be held accountable for the following rationalization but the strikingly improved pigment dispersions over those obtained with phosphinated methyl oleate and the prior art lauryl and stearyl phosphonic acids may be related mainly to the fact that our novel adducts (when not too highly substituted) are completely soluble in both xylol and naphtha whereas the $PCl_3$ phosphinated methyl oleate is incompletely soluble in naphtha and the lauryl and stearyl homologs are only poorly soluble therein.

*Example 4*

Dehydrated castor oil, 18 g., was substituted for the isomerized safflower oil of Example 3. After 25 hours of reaction an aqueous methylene chloride solution of the crude 1:1 phosphonic acid adduct ester was hydrolyzed as in Example 3. The dehydrated castor 1:1 substituted phosphonic acid adduct had an acid value of 92 and a phosphorus content of 2.4 percent.

Although we have thus far prepared and tested the phosphonic acid adducts of methyl linoleate, of isomerized safflower oil, and of dehydrated castor oil, it is expected that adducts having flotation preventing and pigment dispersing properties should be obtained with other vegetable oils and esters containing conjugated unsaturation, e.g., linseed, and soybean oils and with alkyl esters of their conjugated fatty acids.

Having fully described our invention we claim:

1. The Diels-Alder adduct of (a) about from 1.0 to 1.7 mole equivalents of a vinyl phosphonic compound selected from the group consisting of vinyl phosphonic acid and vinyl phosphonic dichloride and (b) about 1.0 mole equivalent of a vegetable oil-based material selected from the group consisting of methyl 9,11-linoleate, isomerized safflower oil, and dehydrated castor oil.

2. An equimolar adduct according to claim 1 wherein the vinyl phosphonic compound is vinyl phosphonic dichloride and the vegetable oil-based material is isomerized safflower oil.

3. A method for inhibiting the flotation tendency of phthalocyanine blue pigment in a long oil alkyd coating also containing titanium dioxide, said method comprising adding to said alkyd, prior to applying it as a coating, from about 1 percent to about 4 percent by weight, based on the alkyd solids, of a vinyl phosphonic adduct as defined in claim 1.

4. A titanium dioxide-containing phthalocyanine blue-tinted long oil alkyd paint containing about from 1 to 4 percent by weight of the alkyd solids of a vinyl phosphonic adduct, as defined in claim 1, as a flotation inhibitor.

References Cited

UNITED STATES PATENTS

| | | | |
|---|---|---|---|
| 3,085,100 | 4/1963 | Chang | 106—308 |
| 3,189,628 | 6/1965 | Knight et al. | 260—403 |
| 3,210,209 | 10/1965 | Jones et al. | 106—308 |

DONALD E. CZAJA, *Primary Examiner.*

LEON J. BERCOVITZ, *Examiner.*

R. W. GRIFFIN, *Assistant Examiner.*